United States Patent [19]
Smith

[11] 4,415,291

[45] Nov. 15, 1983

[54] BALL AND SOCKET JOINTS

[75] Inventor: Joseph E. Smith, Birmingham, Mich.

[73] Assignee: Gulf & Western Manufacturing Company, Southfield, Mich.

[21] Appl. No.: 251,254

[22] Filed: Apr. 6, 1981

Related U.S. Application Data

[63] Continuation-in-part of Ser. No. 61,644, Jul. 30, 1979, Pat. No. 4,347,014.

[51] Int. Cl.³ .............................................. F16C 11/00
[52] U.S. Cl. ....................................... 403/36; 403/39; 403/138
[58] Field of Search .................... 403/138, 144, 38, 39, 403/27, 136, 134, 131, 128, 129, 130, 36

[56] References Cited

U.S. PATENT DOCUMENTS

| | | | |
|---|---|---|---|
| 2,707,645 | 5/1955 | Moskovitz | 403/38 |
| 3,791,748 | 2/1974 | Goodrich, Jr. et al. | 403/131 X |
| 4,035,094 | 7/1977 | Herbeuar | 403/138 X |
| 4,113,396 | 9/1978 | Smith | 403/138 |

FOREIGN PATENT DOCUMENTS

| | | | |
|---|---|---|---|
| 1088824 | 9/1960 | Fed. Rep. of Germany | 403/138 |
| 1125420 | 8/1968 | United Kingdom | 403/138 |

*Primary Examiner*—Andrew V. Kundrat

*Attorney, Agent, or Firm*—Hauke and Patalidis

[57] ABSTRACT

A ball and socket joint having a ball provided with an integral stud projecting outwardly through an end of the socket, a portion of the peripheral spherical surface of the ball being in swivelling sliding engagement with a corresponding partial spherical bore in the socket, and a generally disk-shaped retainer member holding the ball in assembly in the socket and applying a pre-load bias to the ball urging the bearing spherical surfaces in mutual engagement, the retainer member having an integral or separate spherical recess in swivelling sliding engagement with a portion of the peripheral surface of the ball opposite to the stud. The ball is a full ball or alternatively a partial ball having a substantially hemispherical protuberance of smaller diameter in engagement with the spherical recess in the retainer member. The pre-load bias is applied either directly by the retainer member as a result of being elastically stressed during assembly of the elements by swaging of the rim of the socket, or is provided by a frusto-conical spring member engaged against the periphery of the retainer member and flattened during assembly or by a dished spring member in direct engagement with the peripheral spherical surface of the ball and elastically deformed through engagement with the retainer member during assembly of the joint.

35 Claims, 11 Drawing Figures

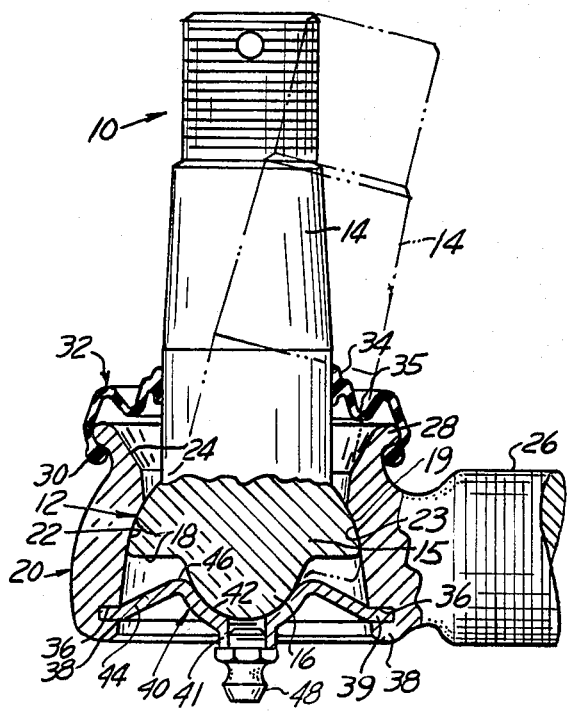
FIG.1
FIG.2
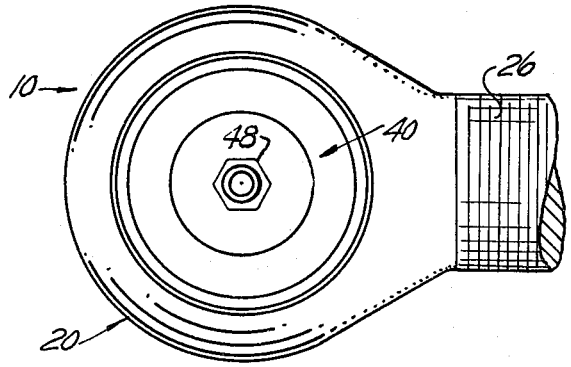
FIG.3
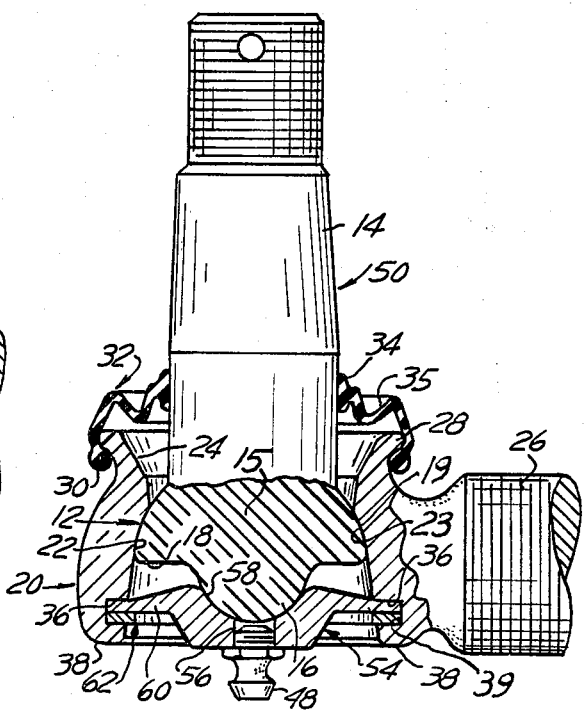
FIG.4
FIG.5
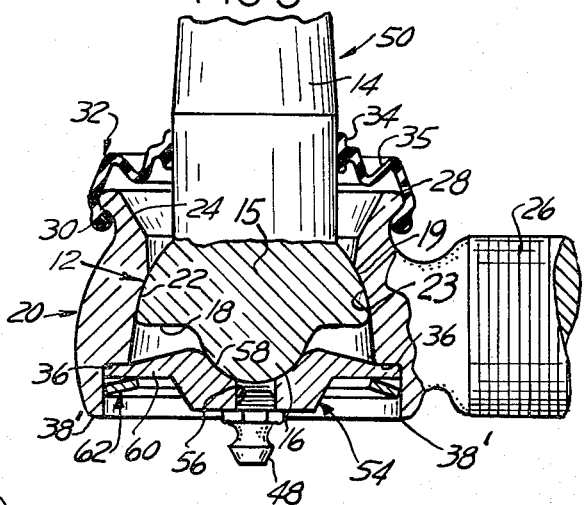

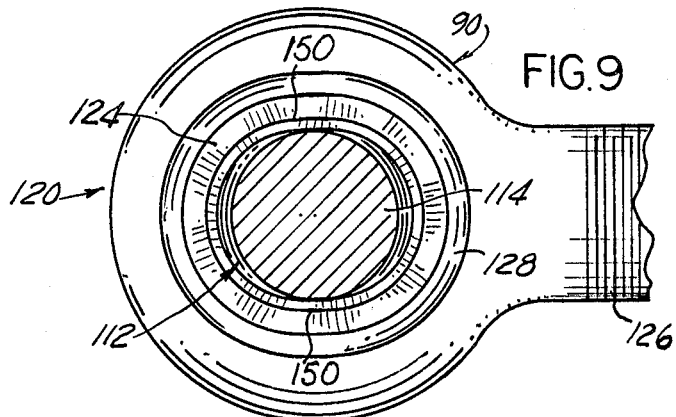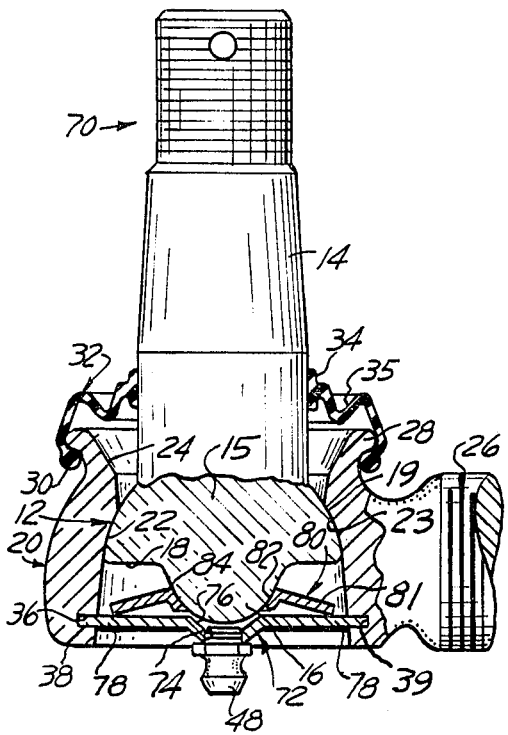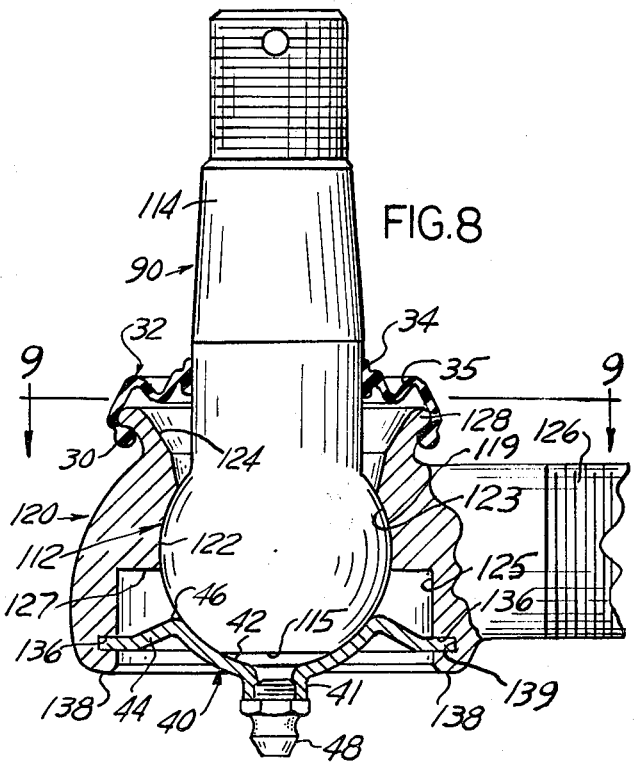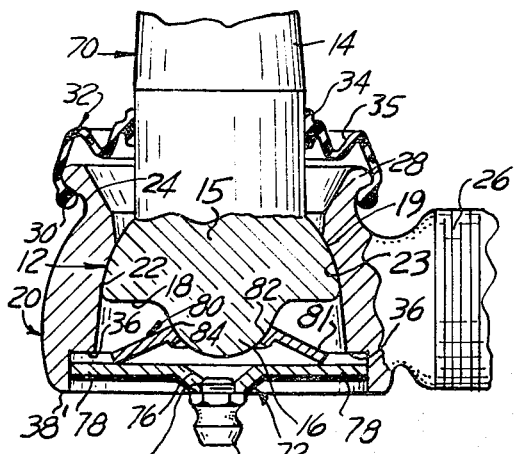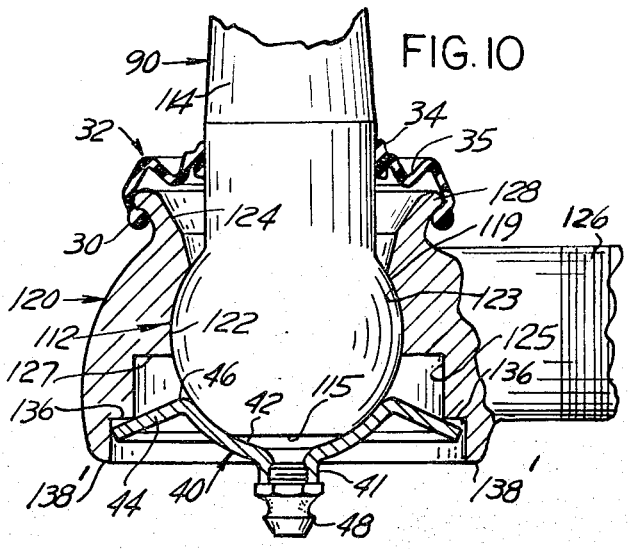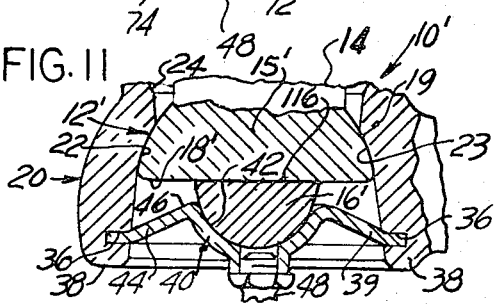

BALL AND SOCKET JOINTS

CROSS-REFERENCE TO RELATED APPLICATIONS

The present application is a continuation-in-part of application Ser. No. 061,644 filed July 30, 1979 now U.S. Pat. No. 4,347,014 and assigned to the same assignee as this application.

BACKGROUND OF THE INVENTION

The present invention relates to a ball and socket joint having improved load-carrying capacity, extended range of motion and simplicity of structure, as compared to conventional ball and socket joints.

Ball and socket joints are commonly used in motor vehicle steering tie rod assemblies, in drag links, torque rods and like structures, in which there is a requirement for transmitting a force from one member to another while permitting one member to swivel or pivot relative to the other.

Ball and socket joints generally consist of a stud terminating in a ball member disposed in swivelling slidable engagement within a socket member having a concave spherical segment conforming to that of the ball. The engaged bearing surfaces of the ball and socket are often biased towards each other such as to provide a relatively tight assembly eliminating play and rattle and automatically compensating for wear of the bearing surfaces.

The shortcomings of conventional ball and socket joints are many. The load-carrying capability of the joints is limited to the relatively small area of the peripheral surface of the ball engaged with the corresponding surface of the socket. A complex structure is required for providing pre-load of the bearing surfaces in arrangements where it is desired to prevent rattles and play and to ensure automatic break-in and usage wear compensation. The range of motion, or amount of angulation, between the elements interconnected by the joint and the load-carrying characteristics of the assembly are limited.

The invention disclosed in copending application Ser. No. 061,644 remedies the inconveniences and shortcomings of the prior art by providing a knuckle or swivel joint structure comprising a stud member terminating in an integral hollow half-ball head member whose peripheral spherical surface engages a conforming concave spherical surface of the socket member, the half-ball member having a substantially hemispherical convex retainer bearing member holding the half-ball peripheral surface in swivelling sliding engagement with the socket spherical bearing surface. Pre-load of the bearing surfaces in engagement is effected by elastically pre-stressing the retainer bearing member or by means of a resilient ring member urging the retainer bearing member towards the hemispherical cavity in the half-ball member of, alternatively, urging a segment of the socket spherical surface in engagement with the half-ball spherical peripheral surface.

SUMMARY OF THE INVENTION

The present invention also remedies the inconveniences and shortcomings of the prior art by providing a ball and socket joint which is lighter in weight and therefore uses less material and which has fewer parts than that generally required for knuckle or swivel joints for heavy-duty applications, such as truck or tractor tie rods, drag links, torque rods and the like. In addition, the present invention provides a knuckle or swivel joint which is able to handle relatively large amounts of angular displacement between the joined elements, which has a tight fit between the bearing surfaces in mutual engagement, which is devoid of play and is rattle-proof and which automatically compensates for break-in and usage wear.

The present invention accomplishes its many objects by providing an improved knuckle or swivel joint comprising a stud member terminating in an integral ball head member having a relatively large peripheral spherical surface engaging a conforming concave spherical surface of the socket member and a relatively small substantially hemispherical convex portion engagd by a corresponding hemispherical concave portion of a retainer bearing member holding the ball large peripheral spherical surface in swivelling sliding engagement with the socket spherical bearing surface. Pre-load of the bearing surfaces in engagement is effected by means of a resilient ring member urging the retainer bearing member towards the relatively small hemispherical portion of the ball member or, alternatively, by providing a resiliently deformable retainer member.

Other objects and advantages of the present invention will become apparent to those skilled in the art when the following description of the best modes contemplated for practicing the invention is read in conjunction with the accompanying drawings wherein like numerals refer to like or equivalent parts and in which:

BRIEF DESCRIPTION OF THE DRAWINGS

FIG. 1 is a side elevational view partly in section of a swivel joint embodying the present invention;

FIG. 2 is a bottom plan view of the structure of FIG. 1;

FIG. 3 is a fragmentary view similar to FIG. 1 showing the same prior to final assembly;

FIGS. 4 and 5 are views corresponding to FIGS. 1 and 3, respectively, of a modified form of the invention;

FIGS. 6 and 7 are views corresponding to FIGS. 1 and 3, respectively, of another modified form of the invention;

FIGS. 8 and 10 are views corresponding to FIGS. 1 and 3, respectively, of still another modified form of the invention;

FIG. 9 is a top plan view with a part removed of the structure of FIG. 8; and

FIG. 11 is a partial view corresponding to FIG. 1 and showing a modification of the structure illustrated therein.

DETAILED DESCRIPTION OF THE PREFERRED EMBODIMENTS

Referring to the drawings in greater detail, and first to FIGS. 1-3, the example of structure shown therein for a knuckle or swivel joint 10 according to the present invention consists of a cold-headed ball 12 having a projecting stud 14 integrally formed at one end thereof. The ball 12 comprises a main body portion 15 of relatively large diameter proximate its integral junction with the stud 14. The side of the ball 12 diametricaly opposite to the stud has a hemispherical protrusion 16 of substantially smaller diameter than the ball main body portion 15, a generally flat annular shoulder 18 surrounding the hemispherical protrustion 16. The main portion 15 of the ball 12, between the shoulder 18 and the stud 14, is formed with a spherical surface 19. The ball 12 is disposed in a socket 20 having a bore 22 and an integrally formed shank 26 projecting from an outside surface of the socket. The bore 22 is formed with a spherical surface 23 to mate with the spherical surfce 19 on the main portion 15 of the ball 12. The socket bore 22 diverges radially as it extends in the direction of the stud 14, such as to form a frusto-conical bore end portion 24 corresponding to an outwardly extending frusto-conical integrally formed retention flange 28 over which is stretched an annular bead 30 formed at the end edge of a flexible oil-resistant bellows seal 32 having at its other end edge an annular flange 34 which is stretched around the periphery of the stud 14. The seal 32 has a bellows type pleated body 35 so that, while its ends remain fast, it can be considerably twisted, stretched and compressed without injury thereto.

The bore 22 of the socket 20 terminates at its other end with an annular shoulder 36 and an annular lip 38 forming a circular groove 39 receiving a generally disk-like retainer cap 40. The retainer cap 40 is preferably a stamping of spring steel formed with a centrally disposed threaded neck 41, a partially spherical recess or cavity 42, and a peripheral flange 44, a reverse bend 46 being formed between the recess 42 and the peripheral flange 44. The neck 41 threadably receives a grease fitting 48.

As shown at FIG. 3, the socket 20 is originally provided with a straight lip flange or rim 38', and the three principal parts forming the knuckle or swivel joint 10 of the invention are assembled together by placing the ball 12 in the bore 22 of the socket 20, disposing the retainer cap 40 with its partially spherical recess 42 in engagement with the hemispherical protrusion 16 of the ball and, by a swaging operation, bending over the socket rim 38' such as to capture the edge of the peripheral flange 44 of the retainer cap 40 in the circular groove 39, FIG. 1, between the socket annular shoulder 36 and the socket bent-over annular lip 38'. It will be readily appreciated that, during the swaging operation, the edge of the peripheral flange 44 is somewhat flattened elastically thus resulting in applying a pre-load to the assembled parts that causes the partially spherical surface 19 of the ball main portion 15 to firmly engage the partially spherical surface 23 of the socket bore 22, and which also results in firmly applying the partially spherical surface of the recess 42 of the retainer cap 40 firmly in engagement with the corresponding surface of the hemispherical protrusion 16 of the ball 12. Therefore, in addition to providing for finish assembly of the parts, the swaging operation causes a pre-load to be exerted on the bearing surfaces in mutual swivelling engagement, which prevents rattles and which automatically compensates for play due to normal wear of the joint, in operation after installation.

The center of the spherical surface 19 of the ball main body portion 15 and the center of the ball hemispherical protrusion 16 coincide such that the knuckle and swivel joint of the invention can be angulated to any extreme position, such as illustrated in phantom line at FIG. 1, without any binding.

Referring now to FIGS. 4 and 5, the modification shown therein, and generally designated 50, consists of the previously described ball 12 and socket 20, the ball 12 being held in the bore 22 of the socket 20 by a modified relatively rigid retainer cap 54. The retainer cap 54 has a threaded central aperture 56 provided with the grease fitting 48, a spherical recess or cavity 58 and a peripheral flange 60. The spherical recess 58 bears against the hemispherical protrusion 16 of the half-ball 12. The biasing means applying a pre-load on the engaged bearing surfaces is provided by a spring member separate from the retainer cap 54 and which is in the form of a dished spring washer 62 disposed between the socket lip 38 and the peripheral flange 60 at the edge of the retainer cap 54. The spring washer 62 is normally frusto-conical, FIG. 5. Prior to finish assembly of the ball and socket joint 50, the retainer cap 54 is disposed with its peripheral flange 60 laid against the socket bore shoulder 36 and the dished spring washer 62 is installed against the peripheral flange 60 of the retainer cap 54. When the socket lip 38 is formed by swaging or bending over the socket rim 38', the dished spring washer 62 is resiliently flattened and held pressing against the peripheral flange 60 of the retainer cap 54, both the flattened spring washer 62 and retainer cap peripheral flange 60 being captured in the circular groove 39 formed between the socket annular shoulder 36 and the annular lip 38.

Referring now to FIGS. 6 and 7, the modification shown therein, generally designated at 70, consists of the previously described ball 12 and socket 20, and a modified retainer cap 72 which has a threaded central aperture 74, a central recess or cavity 76 and a peripheral flange 78. The threaded aperture 74 receives the grease fitting 48. A separate dished spring member 80 is used in conjunction with the retainer cap 72 for applying a pre-load to the bearing surfaces of the ball and socket joint 70. The dished spring member 80 is formed with a peripheral frusto-conical flange 81, an annular recess 82 and a reverse bend 84 at the junction between the annular recess 82 and the peripheral frusto-conical flange 81. The dished spring member 80 is supported and tensioned via the edge of its frusto-conical flange 81 by the retainer cap 72 and its annular recess 82 has a spherical surface engaged against the peripheral surface of the hemispherical protrusion 16 on the ball 12.

During assembly of the ball and socket joint 70, FIG. 7, the dished spring member 80 is laid over the ball 12 with the annular recess 82 engaged over the hemispherical protrusion 16. The retainer cap 72 is placed over the dished spring member 80. The socket rim 38' is swaged or bent over to form the annular lip 38, FIG. 6, thus displacing the retainer cap 72 until its peripheral flange abuts against the socket annular shoulder 36 and holding the peripheral flange 78 of the retainer cap 72 in the groove 39 thus formed. During the swaging operation, the dished spring member 80 is partially flattened and holds the ball 12 securely in assembly in the socket 20, with the tensioned dished spring member 80 providing pre-loading of the bearing surfaces in engagement.

The principles of the invention are also applicable to full ball and socket knuckle or swivelling joints, an example of which is illustrated at 90 at FIGS. 8-10. The structure of the ball and socket joint 90 comprises a full ball 112 integrally formed on the end of a stud 114. The ball 112 is generally spherical except for a flat surface 115 formed on a portion thereof diametrically opposed to the stud 114. The ball 112 is disposed in a socket 120 having a bore 122 provided with a spherical surface portion 123 engaged by the spherical surface 119 of the ball 112. The socket 120 has an outwardly diverging frusto-conical end portion 124, the housing of the socket 120 forming a corresponding outwardly diverging generally frusto-conical flange 128 for mounting thereover the beaded edge 30 of the bellows seal 32. The socket bore 122 has an enlarged cylindrical bore portion 125, an annular step surface 127 being formed between the spherical portion 123 of the bore 122 and the enlarged cylindrical bore portion 125. The surface of the annular step 127 is in an imaginary plane intersecting the spherical surface 119 of the ball 112 substantially along a diameter. The retainer cap 40 is structurally identical to the retainer cap 40 of FIGS. 1 through 3, except that its spherical recess 42 is of a size to accommodate the full ball 112. It is not necessary for the proper functioning of the ball and socket joint 90 of FIGS. 8-10 that the ball 112 be provided with a flat surface as shown at 115. However, forming the ball 112 with such a flat surface 115, disposed such as to correspond to the outlet of the grease fitting 48 results in providing a space which, after filling with grease, acts as a grease reservoir.

As best shown at FIG. 9, the socket frusto-conical bore end portion 124, and the corresponding outwardly flared flange 128 are not necessarily circular but may be formed elliptically, such that swivelling of the stud 114 is allowed on a larger arc along the major diameter of the ellipse than along the minor diameter of the ellipse. Such a structure, providing greater angular motion of the stud 114 along the longitudinal axis of the shank 26 than along the axis perpendicular to the longitudinal axis of the shank, presents particular advantage in ball and socket joints for connecting a steering arm to the steering tie rod of a motor vehicle wherein lateral pivoting of the stud 114 relative to the shank 26 is relatively small as compared to the primary pivoting along the axis of the shank, and need be only large enough to accommodate the narrow range of motion of the steering arm outside of a horizontal plane, due to, for example, camber of the steered roadwheel. The structure if FIG. 9 provides additional wrap-around of the spherical socket surface 123 over the ball 112 at the lateral portions of the socket, designated at 150 at FIG. 9, with the result that the strength of the socket 120 is greatly increased as compared to conventional structures, and that increased wear of the spherical bearing surface 123 of the socket may occur before encountering the risk of pulling the ball 112 from the socket 120. Furthermore, a non-circular retention flange 128 provides improved anchoring for the end of the seal 32 provided with the annular bead 30, and prevents rotation of the seal 32 relative to the socket 120.

Referring now to FIG. 11, there is illustrated a modified ball and socket joint 10' which, instead of being provided with a single piece ball 12 as disclosed with respect to the structures of FIGS. 1-7, has a two-piece ball 12' comprising a half-ball portion 15' integrally connected to the stud 14 and a separate substantially hemispherical portion 16' substituted for the integral hemispherical protrusion 16 of the structure of FIGS. 1 through 7. The half-ball 15' has a circular flat surface 18' engaged with a corresponding circular flat surface 116 forming the end of the hemispherical member 16'. Such a structure, as shown at FIG. 11, consisting of making the ball 12' into separate portions allows for wider manufacturing tolerances and less accurate alignment of the parts during assembly, without causing undue binding of, or excessive friction between, the swivelling member bearing surfaces.

In order to facilitate lubrication of the bearing surfaces in engagement, the spherical surface 23 of the socket bore 22 (FIGS. 1-7, and 11) and the spherical surface 123 of the socket bore 122 (FIG. 8) may be provided with appropriate grooves, not shown, which also facilitate transfer of lubricant from the side of the ball covered by the retainer provided with a grease fitting 48 to the space under the seal 32 on the other side of the ball.

It will thus be seen that there has been provided by the present invention improvements in ball and socket joints in which the object hereinabove set forth, together with many thoroughly practical advantages, has been successfully achieved. While preferred embodiments of the present invention have been shown and described it is to be understood that variations and changes may be resorted to without departing from the spirit of the present invention as defined by the appended claims.

I claim:

1. A ball and socket joint comprising a ball and a socket in mutual swivelling sliding engagement with each other, said ball having a stud integrally formed at an end thereof and projecting outwardly through one end of said socket, a peripheral spherical surface on said ball, said socket having a concave spherical bore surface engaged with a portion of the peripheral spherical surface of said ball proximate the stud, a substantially elliptical frusto-conical bore at said one end of said socket, a disk-shaped retainer member disposed at the other end of said socket, said disk-shaped retainer member having a partially spherical recess concentric to and engaged with a portion of said peripheral spherical surface of said ball farthest away from said stud, biasing means co-operating with said retainer member for urging said concentric spherical surfaces in mutual swivelling sliding engagement, and means holding both said biasing means and retainer member at said other end of said socket, said means comprising an annular step in said socket proximate said other end, said other end forming a rim beyond said annular step bent over for forming a lip holding the periphery of said disk-shaped retainer member against said annular step.

2. The ball and socket joint of claim 1 wherein said biasing means is said disk-shaped retainer member being formed of spring steel and having a frusto-conical integral flange portion, the periphery of said flange portion being elastically deformed when engaged between said annular step and said lip in said socket.

3. The ball and socket joint of claim 1 wherein said biasing means comprises a frusto-conical annular spring member disposed between said lip and said disk-shaped retainer member, said frusto-conical annular spring member being substantially flattened when said lip is formed.

4. The ball and socket joint of claim 1 wherein said biasing means is a frusto-conical spring steel washer having an annular concave spherical portion in engagement with a portion of said ball spherical surface, said disk-shaped retainer member being engaged with the edge of said spring steel washer and applying a pressure against said edge when attached to said other end of said socket with its periphery engaged between said annular step and said lip.

5. The ball and socket joint of claim 1 wherein said ball is a full ball.

6. The ball and socket joint of claim 5 wherein said full ball has a flat surface diametrically disposed opposite said stud.

7. The ball and socket joint of claim 1 further comprising a grease fitting disposed substantially at the center of said disk-shaped retainer member.

8. The ball and socket joint of claim 1 wherein said ball has a substantially half-ball portion for fitting said partial spherical surface in said socket, and a substantially hemispherical portion of smaller diameter adapted to fit said partially spherical recess in said disk-shaped retainer member.

9. The ball and socket joint of claim 8 wherein said half-ball portion and said hemispherical portion are integrally formed in a single piece.

10. The ball and socket joint of claim 8 wherein said half-ball portion and said hemispherical portion are separate, said half-ball portion and said hemispherical portion having each a plane surface engaged with a corresponding plane surface of the other.

11. A ball and socket joint comprising a ball and a socket in mutual swivelling sliding engagement with each other, said ball having a stud integrally formed at one end thereof and projecting outwardly through an end of said socket, a peripheral spherical surface on said ball, said socket having a concave spherical bore surface engaged with a portion of the peripheral spherical surface of said ball proximate said stud, a disk-shaped retainer member disposed at the other end of said socket, said disk-shaped retainer member having a partially spherical recess concentric to and engaged with a portion of said peripheral spherical surface of said ball farthest away from said stud, biasing means co-operating with said retainer member for urging said concentric spherical surfaces in mutual swivelling sliding engagement, and means holding both said biasing means and retainer member at said other end of said socket, said means comprising an annular step in said socket proximate said other end, said other end forming a rim beyond said annular step bent over for forming a lip holding the periphery of said disk-shaped retainer member against said annular step, wherein said biasing means comprises a frusto-conical annular spring member disposed between said lip and said disk-shaped retainer member, said frusto-conical annular spring member being substantially flattened when said lip is formed.

12. The ball and socket joint of claim 11 wherein said ball is a full ball.

13. The ball and socket joint of claim 12 wherein said full ball has a flat surface diametrically disposed opposite said stud.

14. The ball and socket joint of claim 11 further comprising a grease fitting disposed substantially at the center of said disk-shaped retainer member.

15. The ball and socket joint of claim 11 wherein said ball has a substantially half-ball portion for fitting said partial spherical surface in said socket, and a substantially hemispherical portion of smaller diameter adapted to fit said partially spherical recess in said disk-shaped retainer member.

16. The ball and socket joint of claim 15 wherein said half-ball portion and said hemispherical portion are integrally formed in a single piece.

17. The ball and socket joint of claim 15 wherein said half-ball portion and said hemispherical portion are separate, said half-ball portion and said hemispherical portion having each a plane surface engaged with a corresponding plane surface of the other.

18. The ball and socket joint of claim 11 wherein said one end of said socket has an outwardly flared flange portion.

19. A ball and socket joint comprising a ball and a socket in mutual swivelling sliding engagement with each other, said ball having a stud integrally formed at one end thereof and projecting outwardly through an end of said socket, a peripheral spherical surface on said ball, said socket having a concave spherical bore surface engaged with a portion of the peripheral spherical surface of said ball proximate said stud, a disk-shaped retainer member disposed at the other end of said socket, said disk-shaped retainer member having a partially spherical recess concentric to and engaged with a portion of said peripheral spherical surface of said ball farthest away from said stud, biasing means co-operating with said retainer member for urging said concentric spherical surfaces in mutual swiveling sliding engagement, and means holding both said biasing means and retainer member at said other end of said socket, said means comprising an annular step in said socket proximate said other end, said other end forming a rim beyond said annular step bent over for forming a lip holding the periphery of said disk-shaped retainer member against said annular step, wherein said biasing means is said disk-shaped retainer member being formed of a single piece of spring steel and having a frusto-conical integral flange portion, the periphery of said flange portion being elastically deformed when engaged between said annular step and said lip in said socket.

20. The ball and socket joint of claim 19 wherein said ball is a full ball.

21. The ball and socket joint of claim 20 wherein said full ball has a flat surface diametrically disposed opposite said stud.

22. The ball and socket joint of claim 19 further comprising a grease fitting disposed substantially at the center of said disk-shaped retainer member.

23. The ball and socket joint of claim 19 wherein said ball has a substantially half-ball portion for fitting said partial spherical surface in said socket, and a substantially hemispherical portion of smaller diameter adapted to fit said partially spherical recess in said disk-shaped retainer member.

24. The ball and socket joint of claim 23 wherein said half-ball portion and said hemispherical portion are integrally formed in a single piece.

25. The ball and socket joint of claim 23 wherein said half-ball portion and said hemispherical portion are separate, said half-ball portion and said hemispherical portion having each a plane surface engaged with a corresponding plane surface of the other.

26. The ball and socket joint of claim 19 wherein said one end of said socket has an outwardly flared flange portion.

27. A ball and socket joint comprising a ball and a socket in mutual swivelling sliding engagement with each other, said ball having a stud integrally formed at one end thereof and projecting outwardly through an end of said socket, a peripheral spherical surface on said ball, said socket having a concave spherical bore surface engaged with a portion of the peripheral spherical surface of said ball proximate said stud, a disk-shaped retainer member disposed at the other end of said socket, said disk-shaped retainer member having a partially spherical recess concentric to and engaged with a portion of said peripheral spherical surface of said ball farthest away from said stud, biasing means co-operating with said retainer member for urging said concentric spherical surfaces in mutual swivelling sliding engagement, and means holding both said biasing means and retainer member at said other end of said socket, said means comprising an annular step in said socket proximate said other end, said other end forming a rim beyond said annular step bent over for forming a lip holding the periphery of said disk-shaped retainer member against said annular step, wherein said biasing means is a frusto-conical spring steel washer having a flanged annular concave spherical portion in engagement with a portion of said ball spherical surface, said disk-shaped retainer member being engaged with the edge of said spring steel washer and applying a pressure against said edge when attached to said other end of said socket with its periphery engaged between said annular step and said lip.

28. The ball and socket joint of claim 27 wherein said ball is a full ball.

29. The ball and socket joint of claim 28 wherein said full ball has a flat surface diametrically disposed opposite said stud.

30. The ball and socket joint of claim 27 further comprising a grease fitting disposed substantially at the center of said disk-shaped retainer member.

31. The ball and socket joint of claim 27 wherein said ball has a substantially half-ball portion for fitting said partial spherical surface in said socket, and a substantially hemispherical portion of smaller diameter adapted to fit said partially spherical recess in said disk-shaped retainer member.

32. The ball and socket joint of claim 31 wherein said half-ball portion and said hemispherical portion are integrally formed in a single piece.

33. The ball and socket joint of claim 31 wherein said half-ball portion and said hemispherical portion are separate, said half-ball portion and said hemispherical protion having each a plane surface engaged with a corresponding plane surface of the other.

34. The ball and socket joint of claim 1 wherein said one end of said socket has an outwardly flared flange portion.

35. The ball and socket joint of claim 27 wherein said one end of said socket has an outwardly flared flange portion.

* * * * *